Patented Apr. 19, 1932

1,855,026

UNITED STATES PATENT OFFICE

JOHN W. LIVINGSTON, OF KIRKWOOD, AND MAX LUTHY, OF ST. LOUIS, MISSOURI, ASSIGNORS TO MONSANTO CHEMICAL WORKS, OF ST. LOUIS, MISSOURI, A CORPORATION OF MISSOURI

TREATMENT OF BY-PRODUCTS OF THE COCOA AND CHOCOLATE INDUSTRIES

No Drawing. Application filed August 15, 1927. Serial No. 213,198.

This invention relates primarily to the recovery of fats and alkaloids from by-products of the cocoa and chocolate industries, particularly cocoa by-products of the kind commonly referred to as cocoa press cake, cocoa expeller cake and cocoa shells.

It has been attempted to extract the fat from such cocoa products with benzol, and attempts have also been made to remove the fat and also the alkaloids by using solvents capable of dissolving fat and alkaloids, such for instance, as chloroform, tetrachloride of ethane, and phenol. Benzol will remove the fat of such cocoa products, but it will not dissolve the theobromine, one of the cocoa alkaloids, and chloroform is not satisfactory on account of the fact that it has only a low solubility for theobromine.

Moreover, chloroform is so expensive and so highly volatile that its use for the purpose mentioned is not commercially feasible. Tetrachloride of ethane and phenol have such a high boiling point that they can not be readily separated from the fat extracted from the cocoa material, and as they have a very objectionable odor, they cannot be used advantageously to produce a cocoa butter of an edible quality. Accordingly, notwithstanding the fact that the cocoa and chocolate industries produce large quantities of by-products of the kind mentioned, such by-products have heretofore been considered practically a waste material, as the processes which have been tried to recover the valuable constituents of such products have had numerous objections that prevented them from being used on a commercial scale.

One object of our invention is to provide a practicable process by which the fat or the alkaloids or the fat and the alkaloids of cocoa by-products of the kind mentioned can be recovered at a sufficiently low cost to make the use of the process commercially feasible.

Another object of our invention is to provide a process by which edible cocoa butter and relatively high yields of caffein and theobromine can be obtained from cocoa by-products of the kind mentioned.

Another object is to provide a procedure by which cocoa press cake and similar cocoa products can be treated so as to liberate the cocoa alkaloids which in the cocoa are probably present partly as glucosides or other compounds, and thus enable said cocoa alkaloids to be readily removed with solvents, the said procedure also facilitating the separation of the cocoa material from the solvent used to extract the alkaloids.

And still another object of our invention is to obtain an inexpensive cocoa product, practically free from fat and alkaloids, that is suitable for use as a cattle food or suitable for use as a fertilizer.

In making use of our invention to effect the recovery of the fat and also the alkaloids contained in cocoa products of the kind mentioned, the cocoa product is first subjected to a treatment that hydrolizes the glucosides and other compounds of the cocoa alkaloids and converts said cocoa product into a fluffy material containing considerable moisture. Said material is then extracted with an organic solvent until the fat and alkaloids therein are practically completely removed, and thereafter the solvent is separated from the fat and alkaloids and the fat and alkaloids are separated from each other. After extensive and exhaustive experiments with a large number of solvents suited to the extraction of fat, we discovered that ethylene dichloride, a solvent having the formula $CH_2ClCH_2Cl$ and a boiling point of about 84° C., has the unlooked for properties of being an excellent solvent for fats and also the ability to dissolve $\frac{2}{10}$ths percent of theobromine at a boiling point of about 84° C. Accordingly, in practising our process we prefer to use ethylene dichloride in instances where the fat and also the alkaloids are being recovered, as that particular solvent permits the process to be easily controlled; it is easy to obtain ethylene dichloride in the necessary quantities, if the process is carried out on a large scale, and ethylene dichloride is sufficiently inexpensive to permit it to be used commercially for the recovery of valuable constituents of cocoa products. In instances where a cocoa material of the kind mentioned is being treated to effect the recovery principally of the fat contained in same, it is not absolutely necessary to subject the cocoa material to the pre-treatment previously described to liberate the alkaloids, although we prefer to do so.

In using our process to recover the fat, the caffein and the theobromine in cocoa press cake, cocoa expeller cake, or cocoa shells, the cocoa product is first mixed with water and subjected to heat, it being preferable to first grind the cocoa product so that it is in a finely divided state. Hot water or steam may be used in this step of the process, or hot water combined with steam may be used, the temperature varying from 50° C. to 120° C. The quantity of water that is used may be varied, but it is preferable to use enough water to insure the treated material containing from 10% to 40% of moisture. The above described treatment liberates the cocoa alkaloids, which in the cocoa are probably present partly as glucosides or other compounds, or in any other form in which they cannot be extracted directly with solvents; it insures a relatively high yield of alkaloids, and it enables the cocoa material to separate readily from the solvent which is used in the subsequent step of the process, thereby enabling the extraction to be carried out rapidly enough to adapt the process for commercial use on a large scale in the recovery of fat and alkaloids from cocoa waste products. This treatment changes the color of the cocoa material to a dark red, and it changes its texture so that it is now a substantially fluffy material.

After being subjected to the preliminary treatment or pre-treatment above described, the cocoa product is charged into extractors and mixed with ethylene dichloride, the mixture being stirred or agitated for a period varying from 15 minutes to one hour and being maintained at a temperature varying from 60° to 85°. The mass is then allowed to settle and the clear supernatant liquid extract, containing part of the fat and part of the alkaloids of the cocoa material, is then drawn off. If necessary, the decanted liquid can be filtered to remove a small amount of the solid material. Thereafter, fresh solvent of the same kind is added to the mass in the extractors and the mass is stirred or agitated for a similar period while being maintained at the temperature mentioned, until the fat and alkaloids have been removed to the desired degree. At the end of the extraction the small amount of solvent which remains in the cocoa material is recovered by distilling off the solvent, either with or without the passage through the material of steam, air or other gases, and with or without the use of a vacuum. The extraction can be carried out continuously in such a way that the passage of the cocoa material and the solvent are in opposite directions, thereby allowing a continuous, counter-current extraction.

If desired, the extraction can be carried out at room temperature, or at a temperature below 60°. When such a temperature is used, it is preferable to carry out this step of the process in two stages, i. e., a first stage, in which the fat and caffein are extracted at a low temperature, and a second stage, in which the theobromine is extracted at a higher temperature.

It is also possible to carry out the extraction under pressure at temperatures above the boiling point of the ethylene dichloride. Under such conditions, the solubility of the theobromine in ethylene dichloride is considerably higher. Such procedure effects a more rapid extraction of the alkaloids, but it has the disadvantage of necessitating the use of a more complicated apparatus built to withstand the higher pressures.

The extract that is drawn off is treated in any suitable way to effect the separation of the solvent from the fat and alkaloids and the separation of the fat from the alkaloids. One procedure that can be used for this purpose consists in heating the extract with or without the use of steam or vacuum so as to boil off the solvent and obtain a concentrated fat solution. The theobromine crystallizes nearly completely from such a solution and can be recovered by filtration. The caffein is extracted from the filtrate by agitation with hot water and is recovered from the water solvent by evaporation or in any other suitable way. This procedure gives a clear separation of the various substances previously referred to, the crude fat being refined in any preferred way, so as to obtain a marketable cocoa butter of an edible quality, and the free fatty acids or other acid products in the crude cocoa fat being removed by any known or preferred method.

Another procedure that may be used for the recovery and the refining of the cocoa fat and cocoa alkaloids, which is desirable, in that it reduces the amount of solvent to be distilled, and also greatly simplifies the separation and the refining of the different substances extracted from the cocoa material, consists in treating the extracts preferably in the presence of a small amount of water, with an alkali or alkali earth, oxide or hydroxide, or with a metal hydroxide or oxide, or with any other material capable of forming a compound of theobromine practically insoluble in the solvent. This treatment not only removes the free fatty acids from the extract, but it also dissolves or takes out the theobromine quantitatively. The salts of the fatty acids and of the theobromine mixed with water and a small amount of solvent float on top of the solvent and fat extract, and can be easily separated from the solvent. Hardly any emulsion is formed. The solvent is returned without any further treatment, to be used again in a subsequent extraction, and the necessity for distillation is thus avoided. If the fat content of the extract is sufficiently high, which is generally the case with the first few extracts which contain practically all the cocoa butter, the extract is clarified by treatment with filter cel or similar materials, or by filtration through dry cotton cloth, etc., so as to cause all the alkaline water to be removed, and then heating the extract with or without the use of vacuum, air, steam or other gases, to boil off the solvent and remove all traces of the solvent. Steam distillation is the preferred method of removing the solvent, and when such procedure is used, the steam is allowed to partially condense in the still and the caffein is recovered from the fat by extraction with the water condensate. The method just described of separating and recovering the various substances extracted from the cocoa material insures a high yield of an edible cocoa butter, without any further treatment after complete removal of the solvent; it separates practically quantitatively theobromine and caffein of a good quality, and it recovers the free fatty acids and other acid products present in the extracted material.

The salts of the fatty acids and theobromine in the water layer are decomposed with a mineral acid, such, for instance, as muriatic acid, forming a water soluble salt in the reaction with the salts of the water layer. This liberates the fatty acids and the theobromine. There is usually sufficient solvent held back in the water layer to dissolve all the fatty acids; if such solvent is not present in the water layer, some additional solvent is added to the mixture. In this way we obtain a clear separation of the acid products in the extracts and the theobromine. The theobromine is recovered in high purity by filtration.

The relatively small quantity of solvent that remains in the spent cocoa material from which the fats and alkaloids have been extracted, can be removed easily by steaming, or by vacuum, or any known method for effecting the removal of solvent from spent material, so as to convert the spent material into a cocoa product containing considerable nutritive elements, that is valuable as a fertilizer and which is well adapted for use as a cattle food, as it contains no harmful alkaloids.

Having thus described our invention, what we claim as new and desire to secure by Letters Patent is:

1. In a process for recovering a substance from cocoa by-products, the preliminary step of subjecting the cocoa product to the action of steam to convert it into a substantially fluffy material containing moisture, prior to treating said cocoa product with a solvent.

2. In a process for recovering a substance from cocoa by-products with a solvent, the preliminary step of combining moisture with the cocoa material while it is at a temperature of from 50 to 120° C. for the purpose of converting it into a substantially fluffy material.

3. A process for recovering fat and alkaloids from cocoa by-products, which consists in combining moisture with such cocoa product while said product is at a temperature of from 50 to 120° C. so as to convert it into a fluffy material containing from 10 to 40% of moisture, adding a solvent for the fats and alkaloids to said material while it is in a heated condition, drawing off the extracted substances and then separating the ingredients of the extract.

4. The process for extracting fats and alkaloids simultaneously from cocoa by-products which comprises treating such cocoa products with liquid ethylene dichloride while maintaining an elevated temperature, thereafter separating the ethylene dichloride from the insoluble matter and finally treating the ethylene dichloride to recover the fats and alkaloids therefrom.

5. In a process for recovering a substance from cocoa by-products with a solvent, the preliminary step of converting the cocoa product into a substantially fluffy material containing from 10% to 40% of moisture, by treating the cocoa product at a temperature of about 50°–120° C. by means of at least one of the following materials, water and steam.

6. A process for recovering substances from cocoa by-products which consists in first liberating such cocoa alkaloids in the cocoa product and thereafter extracting said product with ethylene dichloride to effect the removal of the fat and alkaloids.

7. A process for recovering substances from cocoa by-products, which consists in exposing such cocoa product to a heat and moisture treatment and thereafter extracting the fats and alkaloids contained in said product by means of ethylene dichloride.

8. A process for recovering fat and alkaloids from cocoa by-products, which consists in subjecting such cocoa product to a heat and moisture treatment so as to convert it into a substantially fluffy material containing moisture, extracting the fat and alkaloids contained in said product by means of a solvent medium which is essentially ethylene dichloride and thereafter separating the extracted substances from the solvent and separating the extracted substances from each other.

9. A process for recovering fat and alkaloids from cocoa by-products, which consists in heating such cocoa product and simultaneously combining moisture with same, extracting the resulting material with ethylene dichloride, drawing off the extract, and finally evaporating the solvent from the extracted materials including fat and alkaloids.

10. A process for recovering fat and alkaloids including theobromine, from cocoa by-products, which consists in heating such cocoa product in the presence of moisture, extracting the fat and theobromine from the resulting material with ethylene dichloride, drawing off the extract, causing the theobromine present in the extract to react with a material capable of forming a compound with theobromine which is practically insoluble in the solvent and thereafter separating the solution containing the fat from the compound of the theobromine.

11. A process for recovering substances from cocoa by-products, which consists in subjecting such cocoa product to heat in the presence of moisture thereby liberating the cocoa alkaloids, and thus converting the cocoa product into a substantially fluffy material, extracting such product with ethylene dichloride to effect the removal of the fats and alkaloids.

12. A process for recovering fats and alkaloids from cocoa by-products, which consists in heating such cocoa product in the presence of moisture, extracting such material with ethylene dichloride, drawing off the extract, treating the extract with an alkali or alkali earth oxide or hydroxide in the presence of water and thereafter separating the solution containing the fat and the water layer.

13. A process for recovering fats and alkaloids from cocoa by-products which consists in heating such cocoa product in the presence of moisture, subsequently extracting said material with ethylene dichloride, drawing off the extract, thereafter treating the extract with lime in the presence of water and separating the solution containing the fat from the water layer.

JOHN W. LIVINGSTON.
MAX LUTHY.